US009843377B2

(12) United States Patent
Yeo et al.

(10) Patent No.: US 9,843,377 B2
(45) Date of Patent: Dec. 12, 2017

(54) METHOD AND APPARATUS FOR MEASURING LINK QUALITY IN WIRELESS COMMUNICATION SYSTEM

(71) Applicant: Samsung Electronics Co., Ltd., Suwon-si, Gyeonggi-do (KR)

(72) Inventors: Soo-Bok Yeo, Suwon-si (KR); Dong-Sik Kim, Pohang-si (KR); Heun-Chul Lee, Pocheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 226 days.

(21) Appl. No.: 14/282,659

(22) Filed: May 20, 2014

(65) Prior Publication Data

US 2014/0369215 A1    Dec. 18, 2014

(30) Foreign Application Priority Data

Jun. 14, 2013   (KR) .................. 10-2013-0068603

(51) Int. Cl.
| | | |
|---|---|---|
| *H04B 7/0413* | (2017.01) | |
| *H04B 7/06* | (2006.01) | |
| *H04W 24/08* | (2009.01) | |
| *H04W 48/16* | (2009.01) | |
| *H04L 25/03* | (2006.01) | |

(52) U.S. Cl.
CPC .......... *H04B 7/0669* (2013.01); *H04W 24/08* (2013.01); *H04W 48/16* (2013.01); *H04B 7/0413* (2013.01); *H04L 25/0328* (2013.01); *H04L 2025/03426* (2013.01)

(58) Field of Classification Search
CPC .. H04B 7/0673; H04B 7/0613; H04B 7/0413; H04B 7/0669; H04W 72/1231; H04W 72/1236; H04L 1/0009; H04L 2025/03426; H04L 25/0328
See application file for complete search history.

(56) References Cited

U.S. PATENT DOCUMENTS

| | | | |
|---|---|---|---|
| 9,078,151 B2* | 7/2015 | Lee ........................ | H04W 24/02 |
| 2004/0190641 A1* | 9/2004 | Ojard ....................... | H04L 1/04 |
| | | | 375/261 |
| 2006/0165190 A1* | 7/2006 | Tamaki ................. | H04L 1/0003 |
| | | | 375/262 |
| 2007/0147530 A1* | 6/2007 | Li ...................... | H04L 27/2608 |
| | | | 375/261 |
| 2007/0230382 A1* | 10/2007 | Ding .................... | H04B 7/0413 |
| | | | 370/310 |

(Continued)

*Primary Examiner* — Raj Jain
(74) *Attorney, Agent, or Firm* — Jefferson IP Law, LLP

(57) ABSTRACT

A method and an apparatus for measuring a link quality in a wireless communication are provided. The method of a receiver for measuring the link quality in the wireless communication system includes determining a modulation type for each of at least one reception stream received through at least one antenna based on a modulation order and channel information regarding each of signals transmitted from a plurality of transmission antennas, searching for a parameter corresponding to the determined modulation type from a pre-stored parameter table in which parameters for each modulation type are stored, and calculating a channel capacity for each of the at least one reception streams received through the at least one antenna by using the searched parameter.

12 Claims, 7 Drawing Sheets

(56) References Cited

U.S. PATENT DOCUMENTS

| | | | |
|---|---|---|---|
| 2009/0202014 A1* | 8/2009 | Mujtaba | H04B 7/0417 375/267 |
| 2009/0274074 A1* | 11/2009 | Astely | H04B 7/0619 370/280 |
| 2010/0064185 A1 | 3/2010 | Zheng et al. | |
| 2011/0134747 A1* | 6/2011 | Kwon | H04L 1/1607 370/208 |
| 2014/0233401 A1* | 8/2014 | Jiang | H04W 64/00 370/250 |
| 2014/0369215 A1* | 12/2014 | Yeo | H04W 24/08 370/252 |
| 2015/0288553 A1* | 10/2015 | Qi | H03M 13/6306 375/340 |
| 2016/0029372 A1* | 1/2016 | Sayana | H04L 1/0003 370/329 |

\* cited by examiner

METHOD AND APPARATUS FOR MEASURING LINK QUALITY IN WIRELESS COMMUNICATION SYSTEM

CROSS-REFERENCE TO RELATED APPLICATION(S)

This application claims the benefit under 35 U.S.C. §119(a) of a Korean patent application filed on Jun. 14, 2013 in the Korean Intellectual Property Office and assigned Serial number 10-2013-0068603, the entire disclosure of which is hereby incorporated by reference.

TECHNICAL FIELD

The present disclosure relates to measuring a link quality in a wireless communication system.

BACKGROUND

In a receiver of a wireless communication system, symbols in a single code block transmitted to a transmitter during a single Transmit Time Interval (TTI) experience different channels due to frequency selective fading of the channels. Accordingly, Post Processing Signal to Interference-plus-Noise Ratios (PPSINRs) of the symbols in the single code block have different values. An effective SINR indicating a reception quality for the single code block may be obtained by combining the PPSINRs of all of the symbols in the code block.

In general, methods for calculating an SINR of each symbol in a code block in a Single Input Single Output (SISO) system are explicitly defined. However, in a Multiple Input Multiple Output (MIMO) system, it is not as easy to calculate an SINR for each symbol because a signal received through a specific antenna contains an interference signal generated by a different antenna. In particular, since a Maximum Likelihood (ML) detector, which is used to improve performance at a MIMO receiver in currently, joint-detects the interference signal and thus does not treat the interference signal as a simple noise. Therefore, it is not easy to obtain an SINR for a symbol of a specific stream when the ML detector is used.

Accordingly, various related-art methods have been provided to obtain a link quality for each stream in an approximate method without calculating an SINR when a ML receiver for each symbol of a stream is used. For example, a method for measuring a link quality in a Minimum Mean Square Error (MMSE) detection method in a receiver using the ML detector has been provided. However, this method has a problem that the link quality is not exactly measured when a Signal to Noise Ratio (SNR) is high. That is, when the SNR is high, the PPSINR of each symbol in the code block is theoretically very low because power of the interference signal generated by the different antenna is operated as a noise. However, since the ML detector actually joint-detects the interference signal, the PPSINR of each symbol in the code block is high. Therefore, an error occurs in the result of measurement of the link quality when the MMSE detection method is used. Such a link quality measurement error may result in an error in channel status information feedback such as Channel Quality Indicator (CQI) feedback, Rank Indication (RI), or Precoding Matrix Indicator (PMI), and thus may cause grave deterioration in performance of a link throughput.

Therefore, there is a demand for a method for measuring a link quality without causing a measurement error or performance deterioration when an ML detector is used in a MIMO system The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for measuring a link quality for each stream when a detector of an Maximum Likelihood (ML) method is used in a wireless communication system.

Another aspect of the present disclosure is to provide a method and apparatus for calculating Mutual Information per Bit (MIB) using channel information and modulation information in a Multiple Input Multiple Output (MIMO) system.

Another aspect of the present disclosure is to provide a method and apparatus for calculating a channel capacity for each stream without calculating a Signal to Interference-plus-Noise Ratio (SINR) in a MIMO system.

In accordance with an aspect of the present disclosure, a method of a receiver for measuring a link quality in a wireless communication system is provided. The method includes determining a modulation type for each of at least one reception stream received through at least one antenna based on a modulation order and channel information regarding each of signals transmitted from a plurality of transmission antennas, searching for a parameter corresponding to the determined modulation type from a pre-stored parameter table in which parameters for each modulation type are stored, and calculating a channel capacity for each of the at least one reception streams received through the at least one antenna by using the searched parameter.

In accordance with another aspect of the present disclosure, a receiver for measuring a link quality in a wireless communication system is provided. The received includes a channel capacity calculator configured to determine a modulation type for each of at least one reception stream received through at least one antenna based on a modulation order and channel information regarding each of signals transmitted from a plurality of transmission antennas, to search for a parameter corresponding to the determined modulation type from a pre-stored parameter table in which parameters for each modulation type are stored, and to calculate a channel capacity for each of the at least one reception streams received through the at least one antenna by using the searched parameter.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present disclosure relates to a method and apparatus for measuring a link quality when a multi-antenna system uses a detector of a Maximum Likelihood (ML) method.

Hereinafter, a method and apparatus for measuring a link quality when a detector of an ML method is used in a wireless communication system supporting multiple antennas will be explained. Hereinafter, a method for calculating Mutual Information per Bit (MIB) for a Single Input Multiple Output (SIMO) system, a Multiple Input Single Output (MISO), or a Multiple Input Multiple Output (MIMO) system, based on a method for calculating MIB in a Single Input Single Output (SISO) system will be explained.

Figure 1:
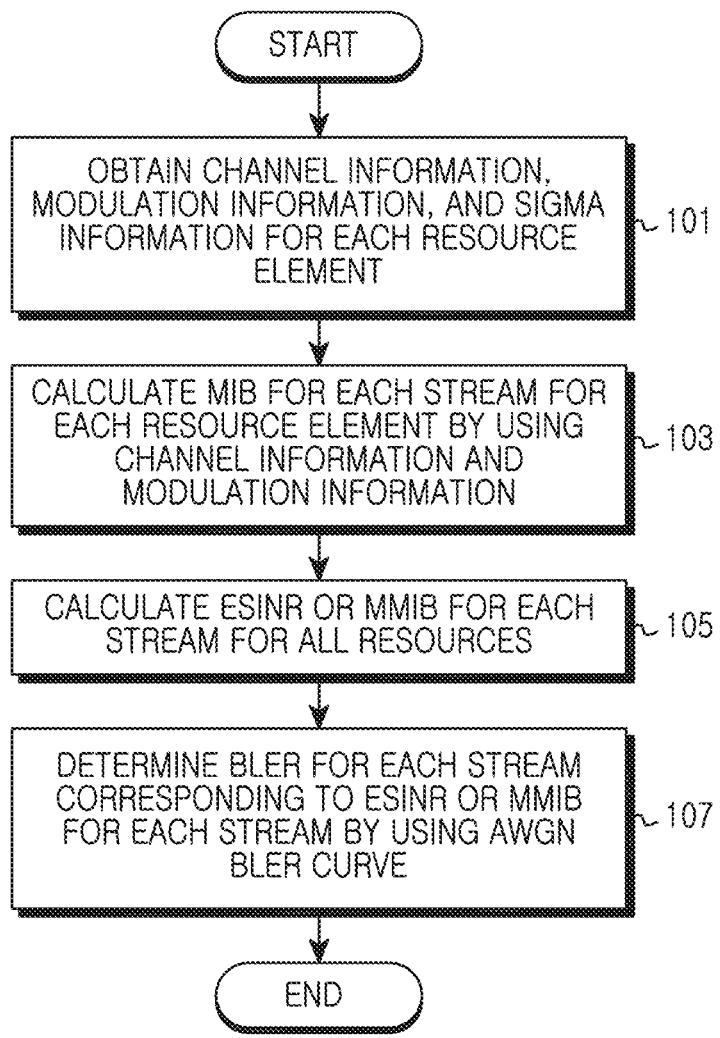
FIG. 1 is a view illustrating a procedure for measuring a link quality for each stream of a receiver according to an embodiment of the present disclosure.

As shown in FIG. 1, based on the method for calculating MIB in the SISO system, MIB for each stream is calculated by using channel information and modulation information without calculating a Signal to Interference-plus-Noise Ratio (SINR) of each bit for each stream in a multi input and/or multi output system.

FIG. 1 illustrates a procedure for measuring a link quality for each stream of a receiver according to an embodiment of the present disclosure.

Referring to FIG. 1, the receiver obtains channel information, modulation information, and sigma ($\sigma^2$) information regarding each resource element in operation 101. The channel information recited herein may include a channel matrix H. In this case, the channel matrix H may be an effective channel matrix that reflects a Precoding Matrix Indictor (PMI).

The receiver calculates MIB for each stream for each resource element by using the channel information and the modulation information in operation 103. The Mutual Information (MI) may refer to a channel capacity and the MIB may refer to a channel capacity for each bit. According to an embodiment of the present disclosure, when signals transmitted from a plurality of transmission antennas are combined and received in a MISO or MIMO system, the receiver regards the corresponding signals as a single stream. In addition, according to an embodiment of the present disclosure, the receiver may determine a modulation order of the received single stream based on a combination of modulation orders of the signals transmitted from the plurality of transmission antennas. Information on the modulation order of each of the transmission signals may be directly received from a transmitter.

The receiver calculates an Effective SINR (ESINR) or Mean Mutual Information per Bit (MMIB) for each stream for all of the resources based on the MIB for each stream in operation 105. The method for calculating the MIB by using the channel information and the modulation information, and calculating the MMIB based on the MIB will be explained below in detail with reference to FIGS. 2 to 6.

In operation 107, the receiver determines a Block Error Rate (BLER) for each stream corresponding to the calculated effective SINR or MMIB for each stream by using an Additive White Gaussian Noise (AWGN) vs BLER curve, which is pre-stored in the receiver.

The receiver finishes the procedure according to the embodiment of the present disclosure.

The method for calculating mutual information in the SISO system will be explained. Since the method for calculating the mutual information of the SISO system is well known, a detailed description thereof is omitted from the specification and a brief explanation will be provided for the understanding of various embodiments of the present disclosure.

The MI in information theory may be defined by Equation 1:

$$I(x, y) = h(x) - h(x|y) = \int \int f_{Y|X}(y|x) f_X(x) \log\left(\frac{f_{Y|X}(y|x)}{f_Y(y)}\right) dx dy \quad \text{Equation 1}$$

where h(x) is an amount of uncertainty existing in a random variable X, and h(x|y) is an amount of uncertainty existing in X after a Y value is recognized.

When a size of an interleaver increases in a digital communication system, a channel capacity of a Bit Interleaved Coded Modulation (BICM) transmission method is equivalent to a channel capacity of m=log 2(M) independent binary channels. Herein, m is a modulation order and M is the number of symbols of a constellation. In the case of a Gaussian channel using a M-QAM modulation method, the channel capacity of the BICM transmission method is equal to a sum of capacities of m equivalent binary channels.

The SISO system having an M-QAM modulation signal x as an input is expressed by Equation 2:

$$y=hx+v$$

$$x \in \{x^0, x^1, \ldots, x^M\}$$  Equation 2 where x is a transmission signal, that is, a modulation symbol, y is a reception signal, h is a memoryless complex static channel, and v is a circularly symmetric complex additive Gaussian noise. Herein, h means a wireless channel different from h described in Equation 1.

MIB in the equivalent binary channel between a code bit (encoder output) and a Log Likelihood Ratio (LLR) may be calculated by using Equation 3:

$$f_{Y|X}(y|x) = \frac{1}{\pi \sigma_v^2} \exp\left(-\frac{|y-hx|^2}{\sigma_v^2}\right)$$  Equation 3

It may be seen from Equation 3 that, when x is given, a Probability Density Function (PDF) of y has an average of hx and a Gaussian distribution of $\sigma_v^2$.

A Posteriori Probability (APP) LLR of a k-th bit of a symbol x may be expressed by Equation 4:

$$l_k = \ln \frac{Pr(b_k = +1|y)}{Pr(b_k = -1|y)} \approx$$  Equation 4

$$\ln \left( \frac{\max_{x|b_k=+1} \exp(-|y-hx|^2/\sigma_v^2) Pr(x|b_k=+1)}{\max_{x|b_k=-1} \exp(-|y-hx|^2/\sigma_v^2) Pr(x|b_k=-1)} \right) +$$

$$\ln \frac{Pr(b_k=+1)}{Pr(b_k=-1)} =$$

$$-\frac{1}{\sigma_v^2} \left( \min_{x|b_k=+1} |y-hx|^2 - \min_{x|b_k=-1} |y-hx|^2 \right)$$

where the second line indicates an approximation of a maximum log Maximum A Posteriori Probability (MAP), and the third line indicates an approximation assuming that x has the same probability on the constellation, and the probability that $b_k$ is +1 is the same as the probability that $b_k$ is −1. A MAP detector on such an assumption may be an ML detector.

The channel capacity for the binary channel of the k-th bit is calculated by using Equation 5:

$$I_{m,k}(b_k; l_k) = 1 -$$  Equation 5

$$\frac{1}{2} \sum_{b_k=\pm 1} E\left[ \log_2 \left( \frac{f_{L_k|B_k}(l_k|b_k=+1) + f_{L_k|B_k}(l_k|b_k=-1)}{f_{L_k|B_k}(l_k|b_k)} \right) \right]$$

Accordingly, a capacity of a SISO channel, that is, a modulation constraint capacity C, may be calculated by using Equation 6:

$$C = \sum_{k=1}^{m} I_{m,k}(b_k; l_k)$$  Equation 6

When the channel capacity is calculated in the related-art SISO system as described above, the PDF of the LLR should be known as shown in Equation 7. However, in general, it is difficult to know this value. Therefore, the related-art method calculates MMIB by approximating the MIB of the M-QAM symbol as a sum of a J(.) function based on an approximating method which is pre-set for each modulation method.

Herein, J(.) is defined by Equation 7 and is a function that indicates MIB according to an SNR when the LLR has a Gaussian distribution in a Binary Symmetric Memoryless Channel (BSMC):

$$J(\sqrt{\gamma}) = I(b; l) = 1 - \int_{-\infty}^{+\infty} \frac{1}{\sqrt{2\pi\gamma}} e^{-\frac{(l-\gamma/2)^2}{2\gamma}} \log_2(1+e^{-l}) dl$$  Equation 7 where γ is an SNR of a symbol.

As described above, the MIB is calculated in the SISO system. Hereinafter, a method for expanding the related-art method of calculating the MIB in the SISO system into a multi-antenna supporting system and applying the method will be explained.

A method in a SIMO system according to an embodiment of the present disclosure will be explained.

The SIMO system is a system that supports a single transmission antenna and a plurality of reception antennas, and a reception signal may be expressed by Equation 8:

$$y=hx+v$$  Equation 8 where y is a reception signal vector and $y \in C^{Nr \times 1}$, h is a channel vector of the SIMO and $h \in C^{Nr \times 1}$, and v is a complex Gaussian noise vector, $v \in C^{Nr \times 1}$, and is Independent and Identically Distributed (IID).

Since a single stream is transmitted in the SIMO system, the MIB is calculated in the same way as in the SISO system, except that Maximal Ratio Combining (MRC) between the reception antennas is performed after an SNR is measured. In the case of the SIMO, the SNR may increase due to reception diversity and thus the MIB may increase.

A method in a MISO system according to an embodiment of the present disclosure will be explained.

The MISO system is a system that supports a plurality of transmission antennas and a single reception antenna and a reception signal may be expressed by Equation 9:

$$y=h^{row}x+v=h_1 x_1+h_2 x_2+ \ldots +h_{Nt} x_{Nt}+v$$  Equation 9 where $h^{row}$ is a row vector indicating a MISO channel and $h^{row}=[h_1, h_2, \ldots, h_{Nt}] \in C^{1 \times Nt}$, and x is a column vector consisting of transmission symbols from the transmission antennas and $x=[x_1, x_2, \ldots, x_{Nt}]^T \in C^{1 \times Nt}$. Each transmission symbol may be modulated in the form of M-QAM, but may have a different modulation order. For example, $x_1$ may be modulated by Quadrature Phase Shift Keying (QPSK) and $x_2$ may be modulated by 16 Quadrature Amplitude Modulation (QAM).

Figure 2:
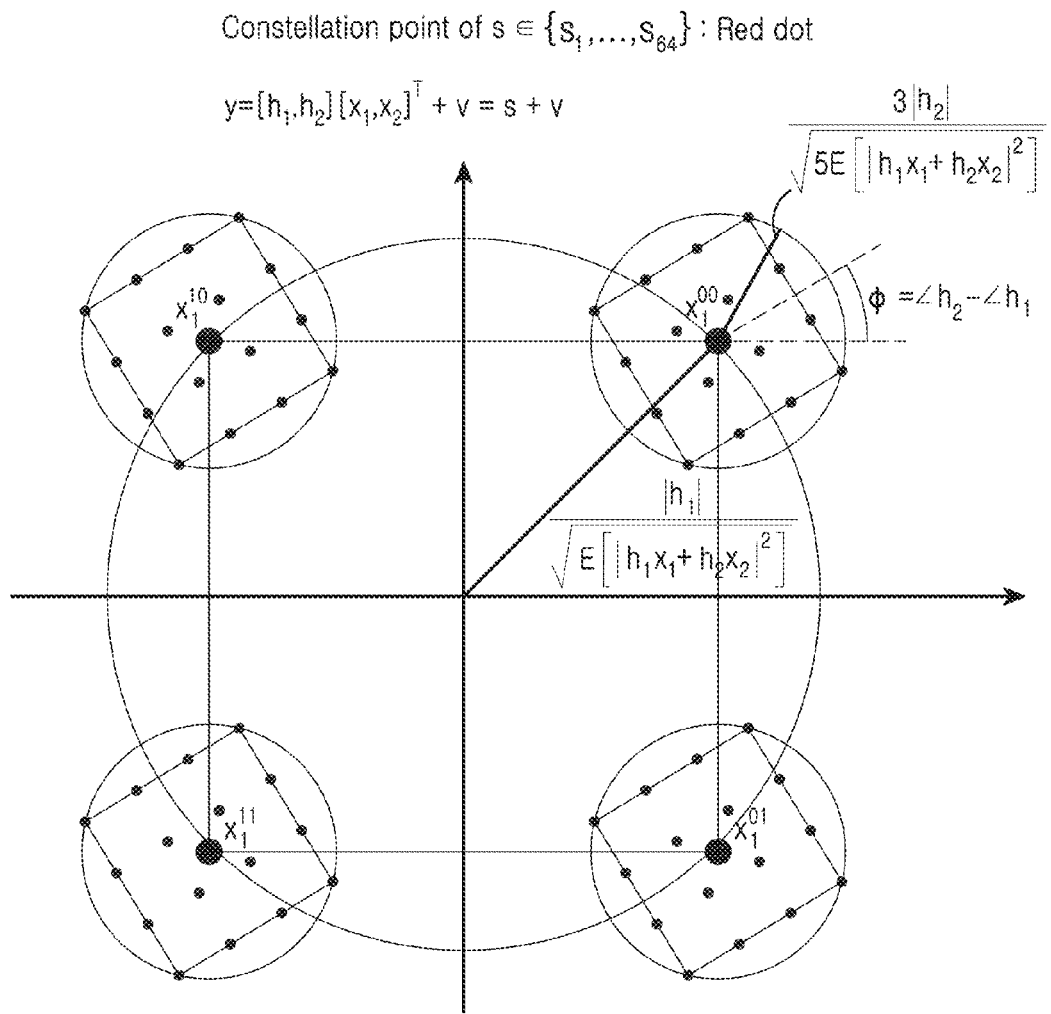
FIG. 2 is a view illustrating an example of a constellation of a reception signal of a receiver according to an embodiment of the present disclosure.

FIG. 2 illustrates an example of a constellation determined by a combination of modulation methods of two streams (for example, m1=log 2(M1)=2→QPSK, m2=log 2(M2)=4→16QAM), and a MISO channel according to an embodiment of the present disclosure.

Referring to FIG. 2, a signal received through the single reception antenna in a receiver is determined by $x_1$ which is modulated by QPSK, $x_2$ which is modulated by 16QAM, and a MISO channel $h_{row}[h_1, h_2]$, and may be expressed by Equation 10:

$$y = h_1 x_1 + h_2 x_2 + \ldots + h_{Nt} x_{Nt} + w = as + v \quad \text{Equation 10}$$

That is, the reception signal of the receiver in the MISO system may be regarded as a SISO system having a single stream 's' as shown in FIG. 2.

When a first stream $x_1$ is a desired signal, a BICM channel capacity of $x_1$ is a part of total channel capacities for a certain M-ary modulation method as shown in FIG. 2. Herein, M may be calculated as a modulation order $M_1$ for $x_1$ and a modulation order $M_2$ for $x_2$. Accordingly, a channel capacity of $x_1$ and a channel capacity of $x_2$ are calculated by using Equation 11:

$$C_{x_1} = \sum_{k=1}^{m_1} I_{m,k}(b_k; l_k) = m_1 \cdot \sum_{P_1=1}^{P_1} w_{P_1} J(c_{P_1} \sqrt{\gamma_1}),$$

$$C_{x_2} = \sum_{k=m_1+1}^{m_1+m_2} I_{m,k}(b_k; l_k) = m_2 \cdot \sum_{P_{12}=1}^{P_2} w_{P_2} J(c_{P_2} \sqrt{\gamma_2}),$$

Equation 11 where $Cx_1$ is a channel capacity of $x_1$ and $Cx_2$ is a channel capacity of $x_2$. That is, it is difficult to calculate a channel capacity for each bit of the stream 's,' calculate the channel capacity of $x_1$ by combining channel capacities of the bits belonging to $x_1$, and calculate the channel capacity of $x_2$ by combining channel capacities of the bits belonging to $x_2$.

As shown in Equation 11, the channel capacity of $x_1$ and the channel capacity of $x_2$ may be approximated by using the sum of J(.). However, since an infinite number of modulation methods (or types) are available to the stream 's' in the MISO system, it is not possible to calculate MMIB according to a modulation order of the MISO system only by the function of calculating MMIB for each of the four modulation methods (BPSK, QPSK, 16QAM, and 64QAM) as in the SISO system.

Accordingly, according to an embodiment of the present disclosure, the infinite number of modulation types in the MISO system may be limited to a finite number of modulation types by using three factors for determining the constellation of the steam 's'. That is, referring to FIG. 2, the constellation of the stream 's' may be determined by a modulation combination determined by the modulation order $M_1$ for $x_1$ and the modulation order $M_2$ for $x_2$, a Signal to Interference Ratio (SIR) expressed by the channel $h_1$ for $x_1$ and the channel $h_2$ for $x_2$, and $\phi$. Parameters for determining the modulation type of the stream 's' by generalizing the three factors to $N_t$ transmission streams may be expressed by Equation 12:

$$\{h^{row}, x\} \text{parameterization} \xrightarrow{\text{modulation}}$$

$$\begin{cases} SIR_t = |h_1|/|h_t| & \text{for } t = 2 \sim Nt \\ \phi_t = \begin{cases} \tilde{\phi}_t & \text{if } \tilde{\phi}_t < 45 \\ 45 - \tilde{\phi}_t & \text{else} \end{cases} & \text{for } t = 2 \sim Nt \\ M_t & \text{for } t = 1 \sim Nt \end{cases}$$

Equation 12 here, $\tilde{\phi}_t = \text{mod}(\angle(h_1^* \cdot h_t) + 360, 90)$

Equation 12 is to parameterize with reference to $x_1$. $h_1$ is a channel between the first transmission antenna and the reception antenna, and $h_t$ is a channel between the t-th transmission antenna and the reception. $\tilde{\phi}_t$ has a range from 0 to 360 degrees, but, the range of $\phi$ is finally specified as 0 to 45 degrees since the constellation of $x_1$ and $x_t$ has a rectangular lattice form as M-QAM. $M_t$ is a modulation order for a transmission signal $x_t$.

According to the embodiment of the present disclosure, when the receiver in the MISO system regards the stream received through the single reception antenna as a single transmission stream, the infinite number of possible modulation orders are limited to a finite number of modulation orders by using Equation 12, and a MIB calculation function for the finite number of modulation orders is pre-stored, so that the MIB according to the SNR of the symbol of the corresponding stream may be obtained. In this method, layers of the ML detector may be divided.

In addition, according to an embodiment of the present disclosure, the method for obtaining the MIB in the MISO system may be expanded and applied to a MIMO system. A method in the MIMO system will be explained below.

The MIMO system is a system that supports a plurality of transmission antennas and a plurality of reception antennas, and a received signal may be expressed by Equation 13:

$$y = Hx + v = h_1 x_1 + h_2 x_2 + \ldots + h_{Nt} x_{Nt} + v = as + v \quad \text{Equation 13}$$

Equation 13 is to model a reception signal of the MIMO system as the SISO system having a single stream 's'. y is a reception signal vector and $y \in C^{Nr \times 1}$, and H is a channel matrix of the MIMO and $H \in C^{Nr \times Nt}$. In addition, s is a symbol vector of a Nr dimension and may be expressed by $s = [s_1, s_2, \ldots, s_{Nr}]$. The shape of the constellation may vary according to each reception antenna. However, the modulation order is the same but the shape of the constellation may vary according to each reception antenna.

Like in the MISO system, each transmission symbol in the MIMO system is modulated in the form of M-QAM, but may have a different modulation order. For example, $x_1$ may be modulated by QPSK and $x_2$ may be modulated by 16QAM. In this case, the signal received at the receiver through the single antenna may be expressed in the method as shown in FIG. 2.

A channel capacity of the single stream 's' in the MIMO system may be expressed by a sum of channel capacities of respective streams as shown in Equation 14:

$$C_S = C_{x_1} + C_{x_2} + \ldots + C_{x_{Nt}},$$

$$C_{x_1} = \sum_{k=1}^{m_1} I_{m,k}(b_k; l_k) = m_1 \cdot \sum_{P_1=1}^{P_1} w_{P_1} J(c_{P_1} \sqrt{\gamma_1})$$

$$\vdots$$

$$C_{x_{Nt}} = \sum_{k=m_1+\ldots+m_{Nt-1}+1}^{m} I_k(b_k; l_k) = m_{Nt} \cdot \sum_{P_{Nt}=1}^{P_{Nt}} w_{P_{Nt}} J(c_{P_{Nt}} \sqrt{\gamma_{Nt}})$$

Equation 14

-continued $$\gamma_t = \frac{|h_t|^2}{\sigma_v^2} = SNR \text{ of each stream in}$$

case of inteference−free

That is, the channel capacity $C_s$ of the single stream 's' may be calculated by a sum of channel capacities of respective streams.

Herein, in order to calculate a channel capacity of an interesting stream $x_i$, parameters $P_i$, $W_{Pi}$, and $C_{Pi}$ for the J(.) function should be known and such parameters exist as many as $N_{MIMO}$.

However, since there is no method for calculating such parameters, all of the $N_{MIMO}$ parameters should be searched. Therefore, much time is required to search desired $P_i$, $W_{Pi}$, and $C_{Pi}$. Therefore, an embodiment of the present disclosure proposes a method for approximating the MIB by transforming the J(.) function as shown in Equation 15:

$$I(x) = \rho J((x \cdot \delta)^\lambda) \quad \text{Equation 15}$$

Figure 3:
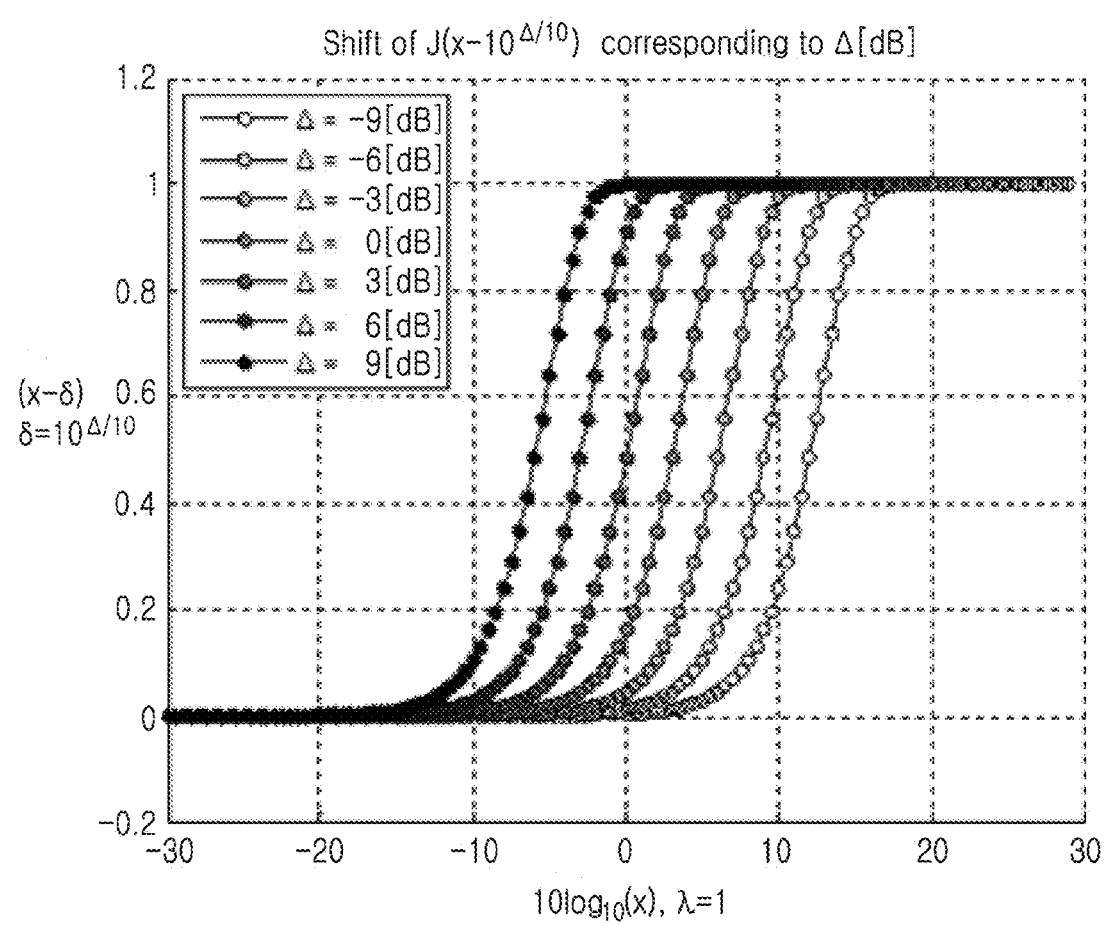
FIG. 3 is a view illustrating a shift characteristic of a function for calculating Mutual Information per Bit (MIB) according to a Signal to Noise Ratio (SNR) of a receiver according to an embodiment of the present disclosure.

That is, Equation 15 represent a method for calculating the MIB by using the transformed J(.) function which is expressed by parameters δ and λ. FIG. 3 illustrates a shift characteristic of the transformed J(.) function expressed in Equation 15, and FIG. 4 illustrates a slope characteristic of the transformed J(.) function.

FIG. 3 is a view illustrating a shift characteristic of a function for calculating an MIB according to a Signal to Noise Ratio (SNR) of a receiver according to an embodiment of the present disclosure.

Figure 4:
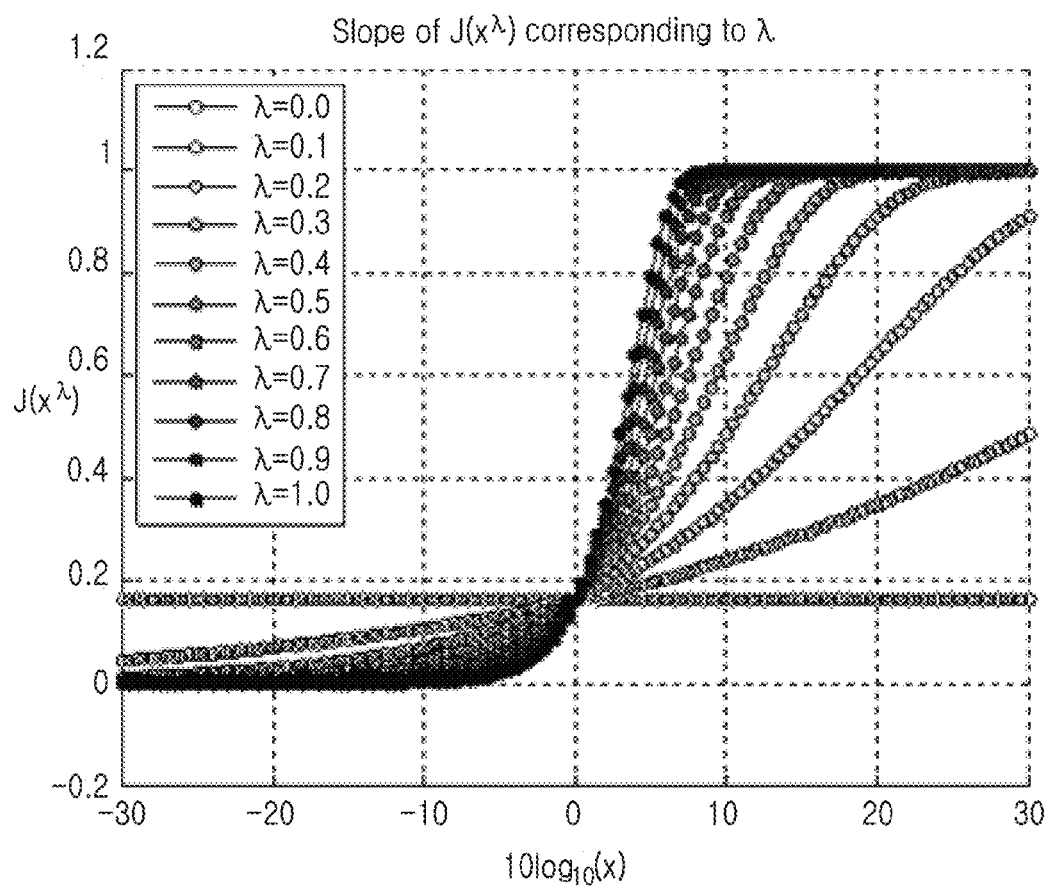
FIG. 4 is a view illustrating a slope characteristic of a function for calculating MIB according to an SNR of a receiver according to an embodiment of the present disclosure.

FIG. 4 is a view illustrating a slope characteristic of a function for calculating MIB according to an SNR of a receiver according to an embodiment of the present disclosure.

The channel capacity of each stream may be expressed by using the transformed J(.) function as in Equation 16:

$$C_{x_1} = \sum_{k=1}^{m_1} I_{m,k}(b_k; l_k) = m_1 \cdot \rho_1 J((\gamma_1 \cdot \delta_1)^{\lambda_1}), \quad \text{Equation 16}$$

$$\vdots$$

$$C_{x_{Nt}} = \sum_{k=m_1+\ldots+m_{Nt-1}+1}^{m} I_k(b_k; l_k) = m_{Nt} \cdot \rho_{Nt} J((\gamma_{Nt} \cdot \delta_{Nt})^{\lambda_{Nt}})$$

$$\gamma_t = \frac{\|h_t\|^2}{\sigma_v^2} =$$

SNR of each stream in case of inteference−free

Herein, in order to calculate the channel capacity of the interesting stream $x_i$, parameters $\rho_i$, $\delta_i$, $\lambda_i$ for the transformed J(.) function should be known and may be searched in the following methods.

The MIMO system should limit the infinite number of modulation types to a finite number of modulation types by using the factors for determining the constellation of the stream 's'. In the MIMO system, an orthogonal factor is added to the three factors for determining the constellation in the MISO system. For example, when a desired signal in the MIMO system having two reception antennas is a first stream $x_1$ and a corresponding channel is $h_1$, and a unit vector of the $h_1$ direction is expressed by $g_1 = h_1/\|h_1\|$ and an orthogonal unit vector is expressed by $g_1^\perp$, a channel of a different stream may be expressed by Equation 17:

$$h_t = \|h_t\| e^{j\psi_t}(\cos\theta_t g_1 + e^{j\psi_t} \sin\theta_t g_1^\perp) \quad \text{Equation 17}$$

Based on this, parameters for determining the modulation type with reference to the stream $x_1$ may be expressed by Equation 18:

modulation Equation 18

{H, x}parameterization
⇒

$$\begin{cases} \theta_t = \cos^{-1}(|h_1^H \cdot h_t|/\|h_1\| \cdot \|h_t\|) & \text{for } t = 2 \sim Nt \\ SIR_t = \|h_1\|/\|h_t\| & \text{for } t = 2 \sim Nt \\ \phi_t = \begin{cases} \tilde{\phi}_t & \text{if } \tilde{\phi}_t < 45 \\ 45 - \tilde{\phi}_t & \text{else} \end{cases} & \text{for } t = 2 \sim Nt \\ (\psi_t - \psi_{t-1}) & \text{for } t = 3 \sim Nt \\ M_t & \text{for } t = 2 \sim Nt \end{cases}$$

here, $\tilde{\phi}_t = \text{mod}(\angle(h_1^H \cdot h_t) + 360, 90)$ and $$\psi_t \angle (e^{-j\angle(h_1^H \cdot h_t)} \cdot (g_1^\perp)^H \cdot h_t)$$

where $\psi_t$ is an orthogonal factor and determines a shape of a constellation of interference components perpendicular to $g_1$. When a single interference signal exists in the MIMO system (that is, Nt=2), $\psi_t$ does not affect the reception performance of the receiver and thus may be excluded from the modulation parameters. However, when two or more interference signals exist in the MIMO system (that is, Nt>2), phases of the two interference signals $x_2$ and $x_3$ may affect the detection of the original signal $x_1$. When more than two reception antennas exist, there are one or more orthogonal unit vectors $g_1^\perp$, and Equation 17 is expressed by another $g_1^\perp$ and Equation 18 for several $g_1^\perp$ may be expressed respectively.

When the parameters shown in Equation 18 are quantized, the number of modulation types occurring for the stream 's' may be expressed by Equation 19:

$$N_{MIMO} = Q_\theta^{Nt-1} \cdot Q_{SIR}^{Nt-1} \cdot Q_\phi^{Nt-1} \cdot Q_\phi^{Nt-2} \cdot 3^{Nt} \quad \text{Equation 19}$$

where the last $3^{Nt}$ means that each stream is modulated in the transmitter of one of the three modulation methods, QPSK, 16QAM, and 64QAM. This may be expanded to the modulation methods such as BPSK and 256QAM.

According to the embodiment of the present disclosure, when the receiver in the MIMO system regards the reception stream as a single transmission stream, the infinite number of possible modulation orders are limited to a finite number of modulation orders by using Equation 18, and a MIB calculation function for the finite number of modulation orders is pre-stored, so that the MIB according to the SNR of the symbol of the corresponding stream may be obtained.

Accordingly, the parameters of the transformed J(.) function for approximating the MIB may be searched as follows:

Channel information and modulation information (H, $M_1, \ldots, M_{NT}$) may be received from the transmitter or may be input in advance according to a design method in advance. Herein, a method for approximating MIB of x1 according to $\gamma_1 = \|h_1\|^2/\sigma$ will be explained.

In this case, the parameter $\rho_1$ of the transformed J(.) function is a maximum MIB value in a given MIMO channel and may be calculated through a simulation shown in Equation 20:

$$\rho_1 = MIB_{SIM}(\gamma_1 = +40[\text{dB}]|H, M_1, \ldots, M_{Nt}) \quad \text{Equation 20}$$

Next, based on the rationale indicating that the J(.) function before the transformation in Equation 7 is MIB=0.16074458 in the case of SNR=0 dB, $\delta_1$ is obtained by calculating SNR meeting MIB=0.16074458 in a simulation and then adding a (−) sign to the calculated value.

$$\gamma_1|\text{MIB}_{sim}=0.16074458, \delta=10^{-\gamma_1/10} \qquad \text{Equation 21}$$

Next, in the range of SNR in which $\gamma_1$ is from −40 dB to +40 dB, $\lambda$ that is most appropriate to a curve of SNR vs MIB and is obtained through a simulation as shown in Equation 22 is determined as $\lambda_1$.

$$\lambda_1 = \mathop{\text{argmin}}_{\lambda \in [0, \ldots, 1]} \sum_{\gamma_1=-40[dB]}^{+40[dB]} (\rho_1 J((\lambda_1 \cdot \delta_1)^\lambda)) -$$

$$\text{MIB}_{sim}(\lambda_1 \mid H, M_1, \ldots, M_{Nt}))^2 \qquad \text{Equation 22}$$

By using above-described Equations 20 to 22, all parameters of the transformed J(.) function for $N_{MINO}$ modulation types may be calculated. According to an embodiment of the present disclosure, parameters for all of the modulation types are calculated in advance and are stored in a table. This is to change the number of modulation types to a finite number of modulation types by performing parameterization with respect to a MIMO channel given for each resource element in a real communication system, as shown in Equation 18, search for the parameters of the transformed J(.) function from the pre-stored table, and finally calculate MIB of $x_1$ using Equation 16.

Since the parameters stored in the table are quantized in the present disclosure, the parameters may not be consistent with parameters calculated in a real MIMO channel. In this case, the parameters may be linearly interpolated and used. For example, although the table factor for $\lambda_1$ is quantized into 0, 10, 20, . . . , 90 at intervals of 10 degrees, $\lambda_1$ calculated for the MIMO channel in the real resource element may be intervals of 15 degrees. In this case, linear interpolation may be performed as shown in Equation 23:

$$\lambda|_{\theta=15°} = \frac{(15-10)}{(20-10)} \cdot \lambda\Big|_{\theta=10°} + \left(1 - \frac{(15-10)}{(20-10)}\right) \cdot \lambda\Big|_{\theta=20°} \qquad \text{Equation 23}$$

Figure 5:
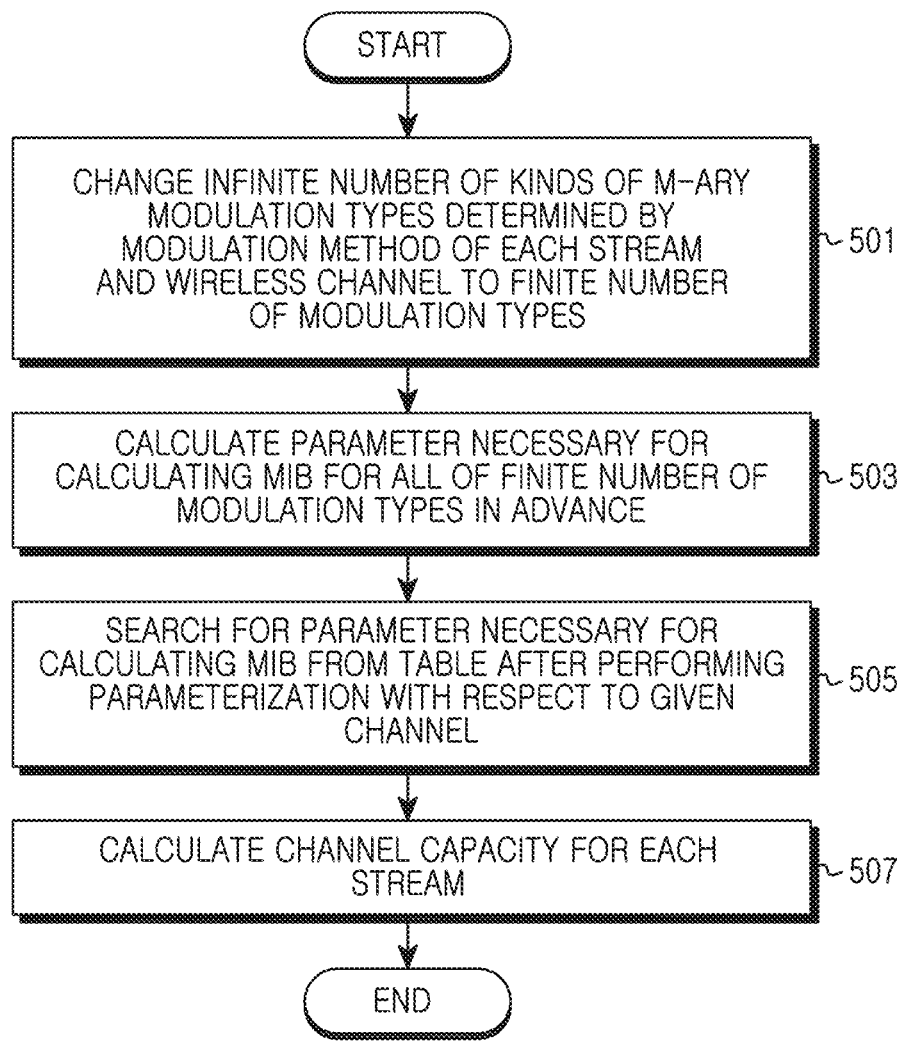
FIG. 5 is a view illustrating a procedure for calculating a channel capacity for each stream in a receiver according to an embodiment of the present disclosure.

FIG. 5 is a view illustrating a procedure for calculating a channel capacity for each stream in a receiver according to an embodiment of the present disclosure. FIG. 5 illustrates operation S103 of FIG. 1 in detail.

Referring to FIG. 5, in operation 501, the receiver changes an infinite number of kinds of M-ary modulation types which are determined by a combination of modulation methods of each stream and a wireless channel to a finite number of modulation types. In the MISO system, the receiver may change the infinite number of kinds of M-ary modulation types to a finite number of modulation types by using Equation 12, and, in the MIMO system, the receiver may change the infinite number of kinds of M-ary modulation types to a finite number of modulation types by using Equation 18. For example, in the MISO system, the infinite number of kinds of M-ary modulation types may be changed to the finite number of modulation types by parameterizing three factors for determining the constellation of the reception stream 's' regarded as a single stream as shown in FIG. 2, that is, a modulation combination determined by the modulation order $M_1$ for $x_1$ and the modulation order $M_2$ for $x_2$, an SIR expressed by the channel $h_1$ for $x_1$ and the channel $h_2$ for $x_2$, and $\phi$, as shown in Equation 12. For another example, in the MIMO system, the infinite number of kinds of M-ary modulation types may be changed to the finite number of modulation types by parameterizing four factors for determining the constellation of the reception stream 's' regarded as a single stream as shown in FIG. 2, that is, a modulation combination determined by the modulation order $M_1$ for $x_1$ and the modulation order $M_2$ for $x_2$, an SIR expressed by the channel $h_1$ for $x_1$ and the channel $h_2$ for $x_2$, $\phi$, and an orthogonal factor, as shown in Equation 18.

In operation 503, the receiver calculates parameters ($\rho_1$, $\delta_1$, and $\lambda_1$) of the J(.) function for calculating MIB for all of the finite number of modulation types in advance. The receiver stores the parameters which have been calculated in advance for all of the finite number of modulation types in a table. In this case, the receiver may calculate the parameters ($\rho_1$, $\delta_1$, and $\lambda_1$) of the J(.) function for all of the finite number of modulation types in advance in the methods as shown in Equations 20 to 22.

In operation 505, the receiver performs parameterization by using channel information of the reception signal received from the transmitter and searches for parameters corresponding to a result of the parameterization from the pre-stored table. For example, the receiver identifies a modulation type by performing parameterization based on the channel information of the reception signal and the modulation information as shown in Equation 12 or 18, and searches for parameters ($\rho_1$, $\delta_1$, and $\lambda_1$) of the J(.) function corresponding to the identified modulation type from the pre-stored table.

In operation 507, the receiver calculates a channel capacity for each stream by using the searched parameters. In this case, the channel capacity may be calculated by using Equation 14 or 16.

The receiver finishes the procedure according to the embodiment of the present disclosure.

Figure 6:
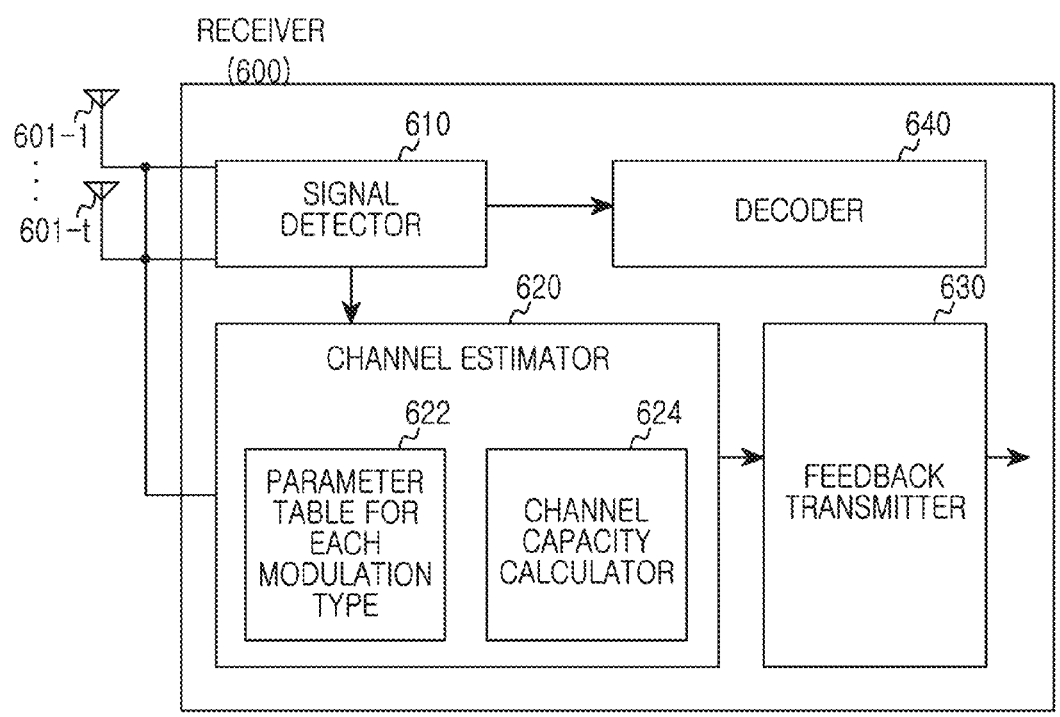
FIG. 6 is a view illustrating a block configuration of a receiver according to an embodiment of the present disclosure.

FIG. 6 illustrates a block configuration of a receiver according to an embodiment of the present disclosure. Referring to FIG. 6, a configuration of a receiver in a MIMO system is illustrated.

Referring to FIG. 6, the receiver 600 includes a plurality of antennas 601-1 to 601-t, a signal detector 610, a channel estimator 620, a feedback transmitter 630, and a decoder 640, but is not limited thereto.

Signals received through the plurality of antennas 601-1 to 601-t are input to the signal detector 610. Although not shown, each of the plurality of reception signals may be processed into a baseband signal, and each of the baseband signals may be OFDM-demodulated and provided to the signal detector.

The signal detector 610 decodes multi-path signals input from the plurality of antennas 601-1 to 601-t according to a predetermined MIMO detection method (for example, ML decoding), thereby estimating the signals transmitted from a transmitter, and outputs the signals. In this case, data output from the signal detector 610 may be LLR data for soft-decision decoding.

The channel estimator 620 may estimate a channel by using a specific signal (for example, a pilot signal) received through the plurality of antennas 601-1 to 601-t. In particular, the channel estimator 620 according to an embodiment of the present disclosure includes a channel capacity calculator 624 to obtain channel information, modulation information, and sigma ($\sigma^2$) information on each resource element, and to calculate MIB, that is, a channel capacity per bit, for each stream regarding each resource element by using the obtained information. In this case, the channel capacity calculator 624 may regard the reception signal received through a single antenna as a single transmission stream 's', perform parameterization by using channel information on the transmission stream 's' as shown in Equation 12 or 18, search for parameters corresponding to a result of the parameterization from a pre-stored parameter table 622 in which parameters for each modulation method are stored, and calculate the channel capacity for each stream by using the searched parameters. In this case, the parameter table 622 indicate parameters ($\rho_1$, $\delta_1$, and $\lambda_1$) of the J(.) function that is pre-calculated in the method as shown in Equations 20 to 22 for each of the finite number of modulation types limited through Equation 12 or 18, as shown in Equations 20 to 22. In addition, the channel capacity may be calculated by using Equation 14 or 16. The channel capacity calculator 624 may calculate an ESINR or MMIB for each stream regarding all of the resources based on the channel capacity for each bit for each stream, that is, the MIB, and may determine a BLER for each stream corresponding to the ESINR or MMIB for each stream by using a pre-stored AWGN BLER curve.

The feedback transmitter 630 receives the channel estimation information (for example, the channel capacity and/or BLER) from the channel estimator 620, and feeds the channel estimation information back to the transmitter. The feedback transmitter 630 may generate channel status information to be fed back such as Channel Quality Indicator (CQI) feedback, Rank Indication (RI), PMI, etc. based on the channel estimation information, and may feed the channel status information back to the transmitter.

The decoder 640 decodes the data input from the signal detector 610, thereby restoring the data to original information data.

As described above, the present disclosure treats the MIMO as the SISO and effectively parameterizes the infinite number of atypical M-ary modulation types appearing in the receiver, thereby exactly predicting the performance of the ML. In particular, since the method proposed in the present disclosure directly calculates the MIB and estimates the BLER based on the calculated MIB, a lot of simulations for obtaining the BLER are not required, a cell throughput may be predicted more exactly, and the exact channel status information may be fed back.

Furthermore, as described above, the present disclosure measures the channel capacity for each stream, so that relative power control between streams may be performed in a Closed Loop MIMO (CL-MIMO) system and thus a throughput of the system may be improved.

Figure 7:
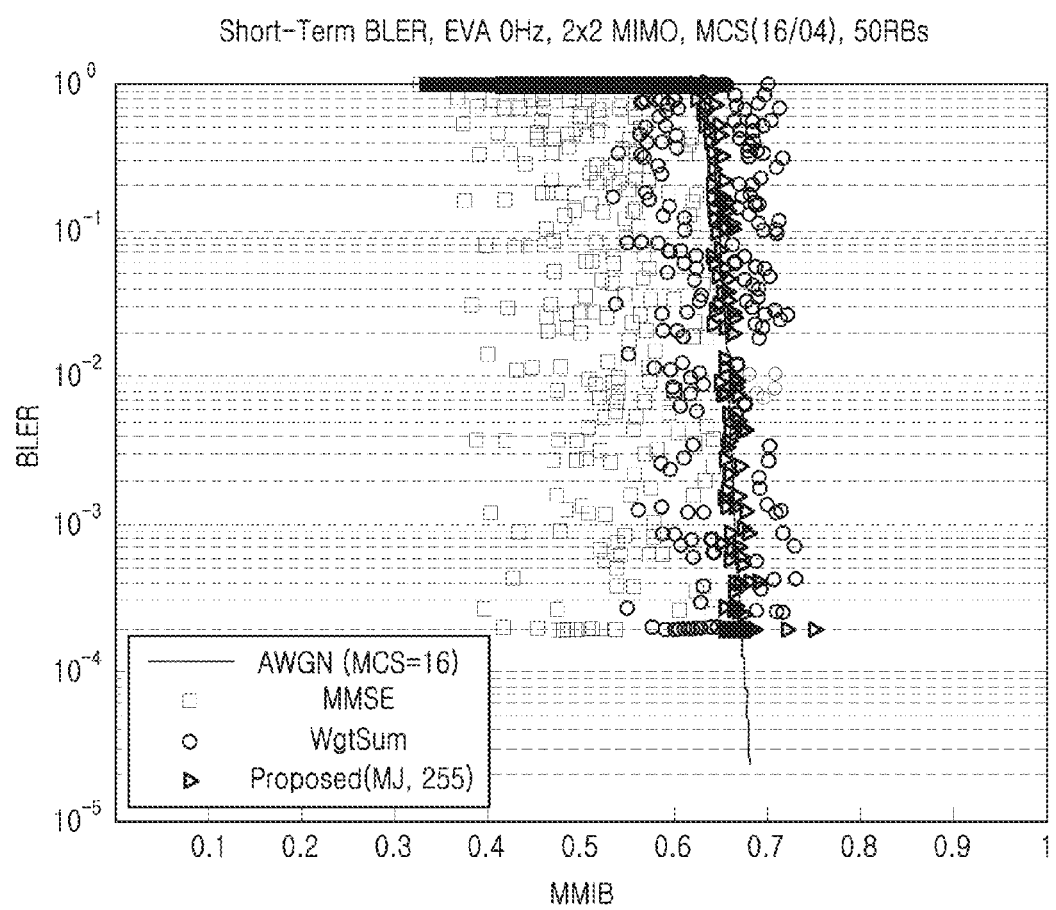
FIG. 7 is a view illustrating a Block Error Rate (BLER) prediction performance graph of a Multiple Input Multiple Output (MIMO) system according to a related-art method and a method of an embodiment of the present disclosure.

FIG. 7 illustrates a BLER prediction performance graph of a MIMO system according to a related-art method and a method according to an embodiment of the present disclosure.

FIG. 7 illustrates performance of estimating a BLER at a downlink receiver using a MIMO ML detector by using related-art methods (MMSE, WgtSum) and the method proposed in the present disclosure. Herein, a Doppler frequency of 0 Hz and an EVA channel are used to check the prediction performance of a short-term BLER. In addition, two transmission streams $x_1$ and $x_2$ are modulated by 16QAM and QPSK, respectively, and 50 Resource Block (RBs) are assigned. In addition, the MIMO channel consists of 500 or more channels, and various ranges of SNR are assigned for every MIMO channel which is realized from −20 dB to +20 dB. To compare the performances, an MSE is calculated by using Equation 24:

$$MSE = E[(MMIB^{ml} - MMIB^{est})^2] \text{constraint on}(10^{-3} < BLER < 1) \quad \text{Equation 24}$$

where $MMIB^{ml}$ is a value that is reverse-mapped by assigning the BLER obtained through the simulation to the MMIB vs AWGN BLER curve, and $MMIB^{est}$ is a MMIB that is obtained through the related-art method and the method proposed in the present disclosure.

The MSE obtained in the method for approximating to the MMSE is 5 dB, the MSE in the method for summing weights of the PIC and the MMSE is −4 dB, and the MSE in the method according to the various embodiments of the present disclosure is −19 dB. Therefore, it may be seen that the method proposed in the present disclosure is superior to the related-art methods.

According to the various embodiments of the present disclosure, when the detector of the ML method is used in the wireless communication system, it is possible to exactly predict a BLER and channel state information based on the MIB, by calculating the MIB based on the channel information and the modulation information, without calculating the SINR.

Although the present disclosure has been described with reference to limited various embodiments and drawings, the present disclosure is not limited to the above-described various embodiments, and many modifications and variations will be apparent to those skilled in the art. Program commands for performing operations implemented by various computers according to various embodiments of the present disclosure may be recorded on a computer-readable recording medium. The computer-readable recording medium may include program commands, data files, and data structures either alone or in combination. The program commands may be those that are especially designed and configured for the present disclosure, or may be those that are publicly known and available to those skilled in the art. Examples of the computer-readable recording medium include magnetic recording media such as hard disks, floppy disks and magnetic tapes, optical recording media such as CD-ROMs and DVDs, magneto-optical recording media such as floptical disks, and hardware devices such as ROMs, RAMs and flash memories that are especially configured to store and execute program commands. Examples of the program commands include machine language codes created by a compiler, and high-level language codes that may be executed by a computer by using an interpreter. When all or some of a base station or a relay described in the present disclosure is implemented by a computer program, a computer-readable recording medium storing the computer program is also included in the present disclosure. Therefore, the scope of the disclosure is defined not by the detailed description of the disclosure but by the appended claims, and all differences within the scope will be construed as being included in the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for operating an electronic device for measuring a link quality in a wireless communication system, the method comprising:
   receiving at least one reception stream through at least one antenna, respectively;
   searching a set of parameters corresponding to on a modulation type for each of the at least one reception stream among a plurality of sets of parameters stored in a parameter table; and calculating a channel capacity for each of the at least one reception stream by using the set of parameters,
wherein each of the at least one reception stream comprises transmission streams respectively transmitted from a plurality of transmission antennas,
wherein the modulation type corresponds to a constellation determined by regarding the transmission streams as a single transmission stream, and
wherein the modulation type is identified based on a modulation order for each of the transmission streams, a signal-to-interference ratio (SIR) determined by channel information for each of the transmission streams, and angle information for a constellation determined by the channel information.

2. The method of claim 1,
wherein the set of parameters comprises a first value, a second value, and a third value,
wherein the first value indicates a maximum value of mutual information per bit (MIB) for the modulation type,
wherein the second value indicates a value obtained by calculating signal-to-noise ratio (SNR) according to a certain value of MIB, and
wherein the third value indicates a value which is selected, among a plurality of values, to calculate curve which is nearest to a curve of the SNR and a MIB.

3. The method of claim 1, wherein the calculating of the channel capacity for each of the at least one reception stream comprises:
calculating channel capacity for each of the transmission streams based on the set of parameters; and
calculating the channel capacity for each of the at least one reception stream by using a sum of channel capacities for the transmission streams.

4. The method of claim 1, wherein the set of parameters are determined by using linear interpolation.

5. The method of claim 1, further comprising:
generating channel state information by using the channel capacity for each of the at least one reception stream; and
transmitting the channel state information back to another electronic device comprising from the plurality of transmission antennas.

6. The method of claim 1, wherein the modulation type is further identified based on an orthogonal factor for at least one interference component for each of the transmission streams.

7. An apparatus of an electronic device for measuring a link quality in a wireless communication system, the apparatus comprising:
at least one antenna configured to receive at least one reception stream, respectively; and
a channel capacity calculator configured to:
search a set of parameters corresponding to a modulation type for each of the at least one reception stream, among a plurality of sets of parameters stored in a parameter table, and
calculate a channel capacity for each of the at least one reception stream by using the set of parameters,
wherein each of the at least one reception stream comprises transmission streams respectively transmitted from a plurality of transmission antennas,
wherein the modulation type corresponds to a constellation determined by regarding the transmission streams as a single transmission stream, and
wherein the modulation type is identified based on a modulation order for each of the transmission streams, a signal-to-interference ratio (SIR) determined by channel information for each of the transmission streams, and angle information for a constellation determined by the channel information for each of the transmission streams.

8. The apparatus of claim 7,
wherein the set of parameters comprises a first value, a second value, and a third value,
wherein the first value indicates a maximum value of mutual information per bit (MIB) for the modulation type,
wherein the second value indicates a value obtained by calculating signal-to-noise ratio (SNR) according to a certain value of the MIB, and
wherein the third value indicates a value which is selected, among a plurality of values, to calculate curve which is nearest to a curve of the SNR and a MIB.

9. The apparatus of claim 7, wherein the channel capacity calculator is further configured to:
calculate channel capacity for each of the transmission streams based on the set of parameters, and
calculate the channel capacity for each of the at least one reception stream by using a sum of channel capacities for the transmission streams.

10. The apparatus of claim 7, wherein the set of parameters are determined by using linear interpolation.

11. The apparatus of claim 7, further comprising a feedback transmitter configured to:
generate channel state information by using the channel capacity for each of the at least one reception stream, and
transmit the channel state information to another electronic device comprising the plurality of transmission antennas.

12. The apparatus of claim 7, wherein the modulation type is further identified based on an orthogonal factor for at least one interference component for each of the transmission streams.

* * * * *